(12) United States Patent
Uchino et al.

(10) Patent No.: US 7,499,213 B2
(45) Date of Patent: Mar. 3, 2009

(54) REAR PROJECTION DISPLAY APPARATUS AND TRANSMISSION TYPE SCREEN

(75) Inventors: Hiroaki Uchino, Tokyo (JP); Takaaki Iwaki, Tokyo (JP); Yasufumi Ogawa, Chiba (JP)

(73) Assignee: Sony Corporation, Tokyo (JP)

( * ) Notice: Subject to any disclaimer, the term of this patent is extended or adjusted under 35 U.S.C. 154(b) by 31 days.

(21) Appl. No.: 11/714,111

(22) Filed: Mar. 6, 2007

(65) Prior Publication Data

US 2007/0216875 A1   Sep. 20, 2007

(30) Foreign Application Priority Data

Mar. 9, 2006   (JP) .............................. 2006-064937

(51) Int. Cl.
  *G03B 21/56* (2006.01)
  *G03B 21/22* (2006.01)
  *H04N 5/64* (2006.01)

(52) U.S. Cl. .......................... 359/443; 359/460; 353/77; 348/744

(58) Field of Classification Search ................. 359/443, 359/445, 449–451, 454, 456, 457, 460; 353/77; 249/59, 61; 29/455.1; 76/107.1; 348/744
See application file for complete search history.

(56) References Cited

U.S. PATENT DOCUMENTS

| | | | | |
|---|---|---|---|---|
| 1,901,963 A | * | 3/1933 | Hansen | 38/102.5 |
| 2,187,904 A | * | 1/1940 | Hurley | 359/445 |
| 2,404,448 A | | 7/1946 | Martin | |
| 3,198,066 A | * | 8/1965 | McGhee | 353/28 |
| 4,406,519 A | * | 9/1983 | Shaw | 359/443 |
| 4,705,355 A | * | 11/1987 | Espo | 359/443 |
| 4,739,567 A | * | 4/1988 | Cardin | 40/471 |
| 5,200,854 A | * | 4/1993 | Ogino et al. | 359/451 |
| 6,084,707 A | * | 7/2000 | Maruyama et al. | 359/460 |
| 6,785,047 B1 | * | 8/2004 | Risher | 359/443 |

FOREIGN PATENT DOCUMENTS

| | | |
|---|---|---|
| EP | 0 911 684 A1 | 4/1999 |
| JP | 07-92565 | 4/1995 |
| JP | 7-92565 | 4/1995 |
| JP | 2004-53638 | 2/2004 |

* cited by examiner

*Primary Examiner*—Melissa J Koval
(74) *Attorney, Agent, or Firm*—Finnegan, Henderson, Farabow, Garrett & Dunner, L.L.P.

(57) ABSTRACT

A rear projection display apparatus includes a transmission type screen, a video projector, a lens sheet, a plurality of pull portions, and a pulling device. The transmission type screen is installed on a front face of an apparatus main body. The video projector is disposed inside the apparatus main body for projecting a video on the transmission type screen from a rear side. The plurality of pull portions are provided along horizontal and vertical sides of the lens sheet and are pulled by a pulling device which extends along a perimeter of the lens sheet.

20 Claims, 7 Drawing Sheets

REAR PROJECTION DISPLAY APPARATUS AND TRANSMISSION TYPE SCREEN

CROSS REFERENCES TO RELATED APPLICATIONS

The present invention contains subject matter related Japanese Patent Application JP 2006-064937 filed in the Japanese Patent Office on Mar. 9, 2006, the entire contents of which being incorporated herein by reference.

BACKGROUND OF THE INVENTION

1. Field of the Invention

The present invention relates to a rear projection display apparatus which projects and displays video on a transmission type screen from the rear side thereof and a transmission type screen used in the rear projection display apparatus.

2. Description of the Related Art

In general, a rear projection display apparatus is configured to project and display video on a transmission type screen installed on the front face of the apparatus main body from a video projector installed on the rear side of the transmission type screen. The transmission type screen used in the rear projection display apparatus uses a lens sheet such as a lenticular lens sheet or a Fresnel lens sheet in order to obtain desired image display performance.

Such a lens sheet needs a device to maintain a predetermined planar shape since the lens sheet itself has low rigidity. In the past, the planar shape has been maintained by bonding the lens sheet to a resin molding plate or glass plate which is a rigid body.

However, because of using the resin molding or glass plate, this configuration increases the weight of the entire screen, which produces the following disadvantages: A frame retaining the screen may need increased rigidity, which tends to increase the cost of material and which increases the thickness of the frame to thereby impose restrictions on the design of the screen.

To eliminate such disadvantages, a screen configured as disclosed in e.g. Japanese Patent Laid-open No. Hei 7-92565 (referred to as Patent Document 1 hereinafter) has been proposed as a transmission type screen that can maintain the planar shape of a lens sheet without use of a resin molding plate or glass plate. More specifically, the screen described in Patent Document 1 is characterized by including ribs fixedly attached to at least one side of a lens sheet, brackets fixedly attached to frames disposed on the circumferential edge of the lens sheet, and an elastic body having a restoring force acting between the rib and the bracket so as to be separate from each other, and in that the lens sheet is stretched and supported by the action of the elastic body.

SUMMARY OF THE INVENTION

However, the screen described in Patent Document 1 may not respond to expansion and contraction or deformation of the lens sheet due to the secular variation or environmental changes since the lens sheet is configured to be pulled in one direction. As a result, the lens sheet produces wrinkles or sag, which causes deterioration in image quality such as distortion of an image or the degradation of focus.

Thus, it is desirable to provide a transmission type screen that reliably suppress the occurrence of wrinkles or sag in a lens sheet, thereby surely preventing deterioration in image quality.

According to an embodiment of the present invention, there is provided a rear projection display apparatus including: a transmission type screen installed on the front face of an apparatus main body; and a video projector disposed inside the apparatus main body and projecting video on the transmission type screen from the rear side thereof, wherein the transmission type screen includes a quadrangular lens sheet and is configured such that a plurality of pull portions provided along horizontal and longitudinal sides of the lens sheet are pulled upward and downward, and leftward and rightward, respectively, by a pulling device provided to extend along the circumference of the lens sheet and the number of the pull portions on the horizontal sides of the lens sheet and the number of the pull portions on the vertical sides thereof are set so as to correspond to a ratio of a horizontal side length to a vertical side length of the lens sheet.

A single wire provided to extend along the circumference of the lens sheet is preferably used as the pulling device of the transmission type screen.

Preferably, the wire and the lens sheet are disposed to be flush with each other.

The pull portion of the transmission type screen is a pulley around which the wire is wound.

In the configuration, force of the wire for pulling the lens sheet can be adjusted by varying a winding angle of the wire wound around the pulley.

According to the embodiment of the present invention, the plurality of pull portions provided along horizontal and longitudinal sides of the lens sheet are pulled upward and downward, and leftward and rightward, respectively, by the pulling device provided to extend along the circumference of the lens sheet. This makes it possible to effectively suppress the occurrence of wrinkles or sag in the lens sheet due to the secular variation or environmental changes. According to an embodiment of the present invention, in particular, the number of the pull portions on the horizontal sides of the lens sheet and that on the vertical sides thereof are set so as to correspond to a ratio of a horizontal side length to a vertical side length of the lens sheet. Therefore, force adapted to pull the horizontal side of the lenticular lens sheet can be made approximately equal, per unit width, to that adapted to pull the vertical side thereof. The lenticular lens sheet can be pulled by the uniform force. As a result, the lenticular lens sheet can be attached with less deflection. Thus, the embodiment of the present invention can surely prevent deterioration in image quality such as distortion of an image or the degradation of focus.

DETAILED DESCRIPTION OF THE PREFERRED EMBODIMENTS

Preferred embodiments of the present invention will hereinafter be described in detail with reference to the drawings.

Figure 1:
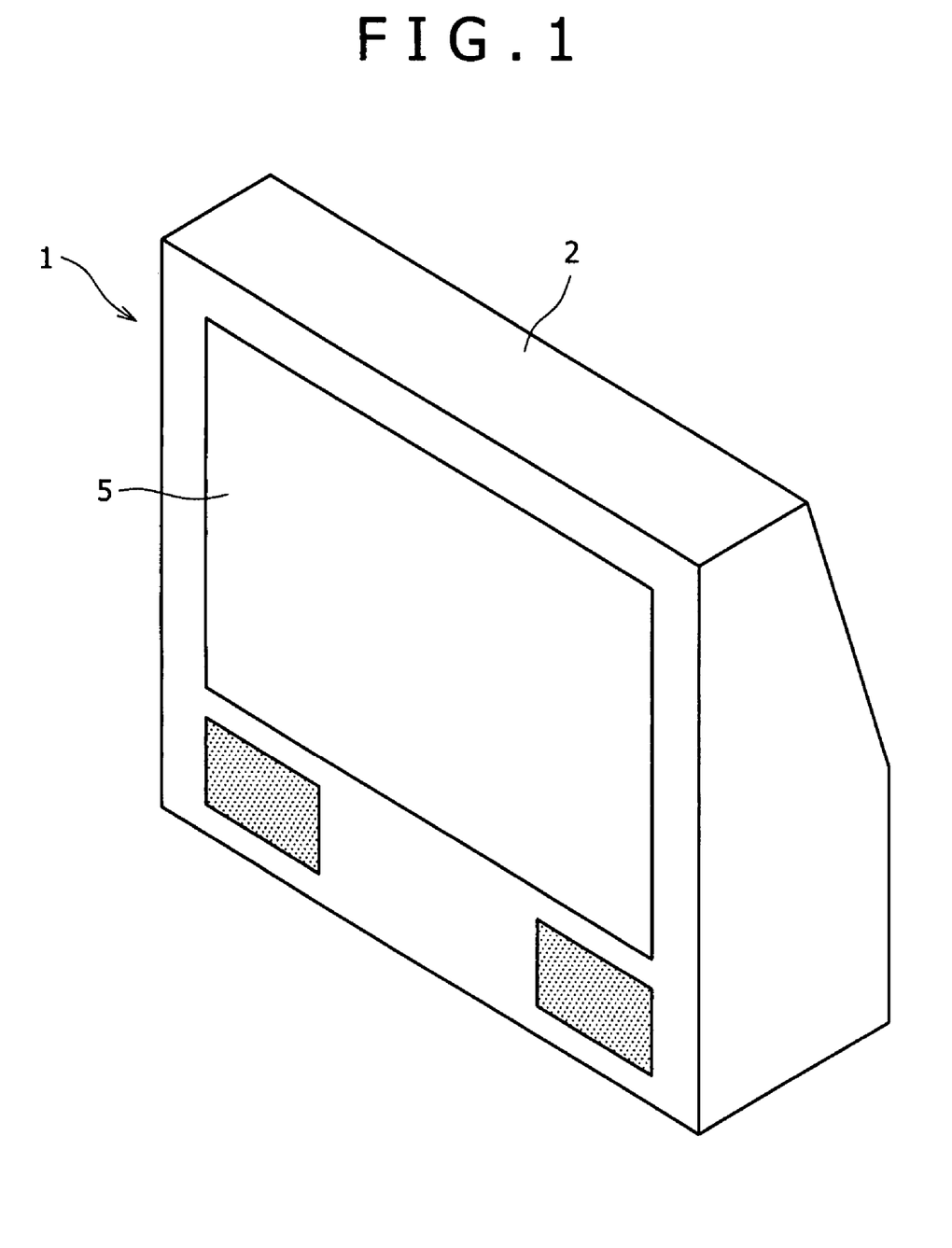
FIG. 1 is a perspective view illustrating the external appearance of a rear projection display apparatus embodying the present invention.
Figure 2:
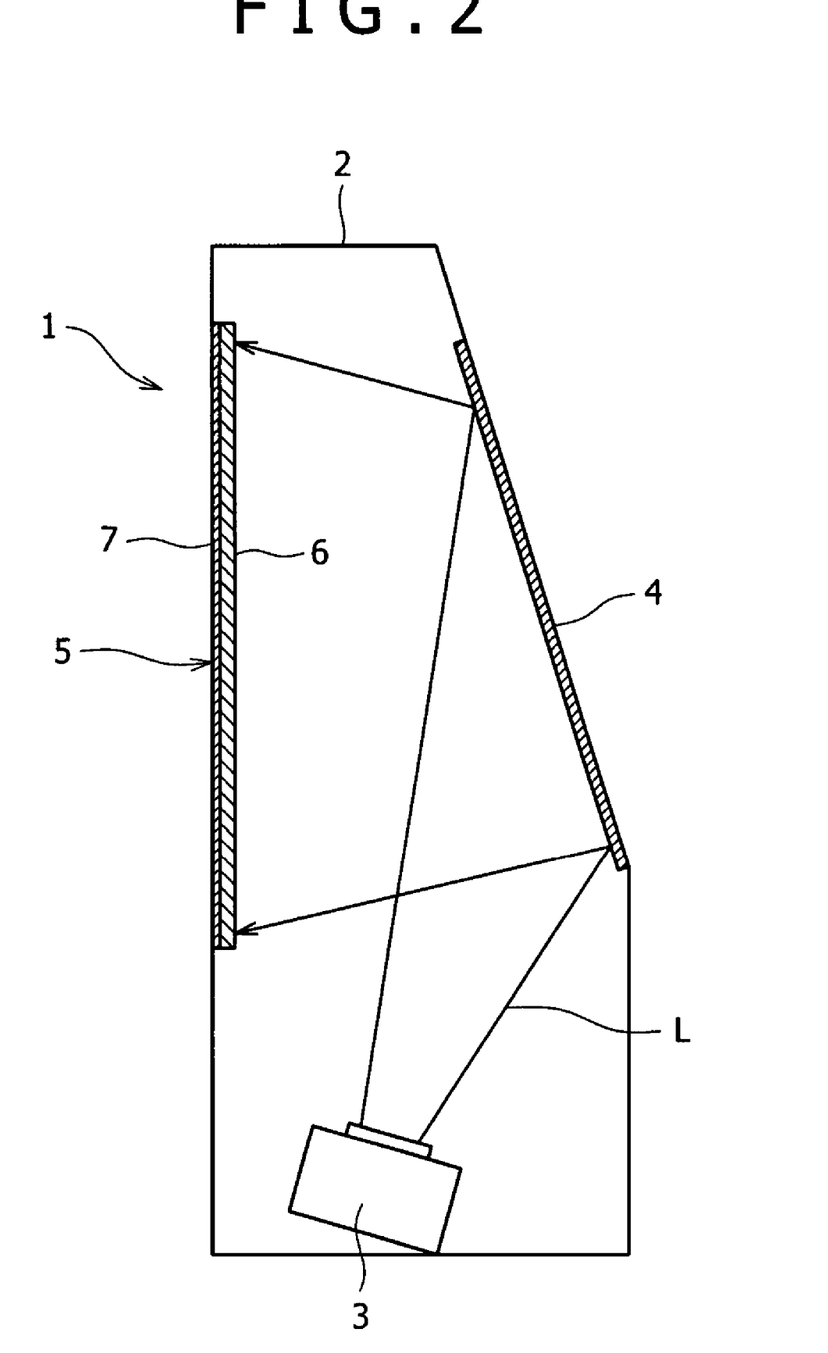
FIG. 2 is a side view illustrating the inner configuration of the apparatus.

FIG. 1 is a perspective view illustrating the external appearance of a rear projection display apparatus according to an embodiment of the invention. FIG. 2 is a side view illustrating the internal configuration of the apparatus.

As shown in FIG. 1, the rear projection display apparatus 1 includes a transmission type screen 5 disposed on the front face of an apparatus main body 2 and projects and displays video on the transmission type screen 5 from the rear side thereof. More specifically, as shown in FIG. 2, a video projector 3 is installed inside the apparatus main body 2. Video light L emitted from the video projector 3 is reflected by a reflection mirror 4 and then projected on the transmission type screen 5.

The transmission type screen 5 is configured such that a Fresnel lens plate 6 adapted to focus light and a lenticular lens sheet 7 adapted to uniformly distribute light to the entire screen are juxtaposed to each other. The Fresnel lens plate 6 includes a resin molding plate or glass plate serving as a substrate and a Fresnel lens sheet bonded to the substrate. On the other hand, the lenticular lens sheet 7 is installed in a state of a sheet, that is, without use of a substrate unlike the Fresnel lens plate 6. This achieves the thinning and weight-saving of the screen 5.

In this configuration, the lenticular lens sheet 7 needs to maintain a stable planar shape in order to ensure the excellent image display performance of the transmission type screen 5. To meet the need, the transmission type screen of the embodiment adopts the following configuration.

Figure 3:
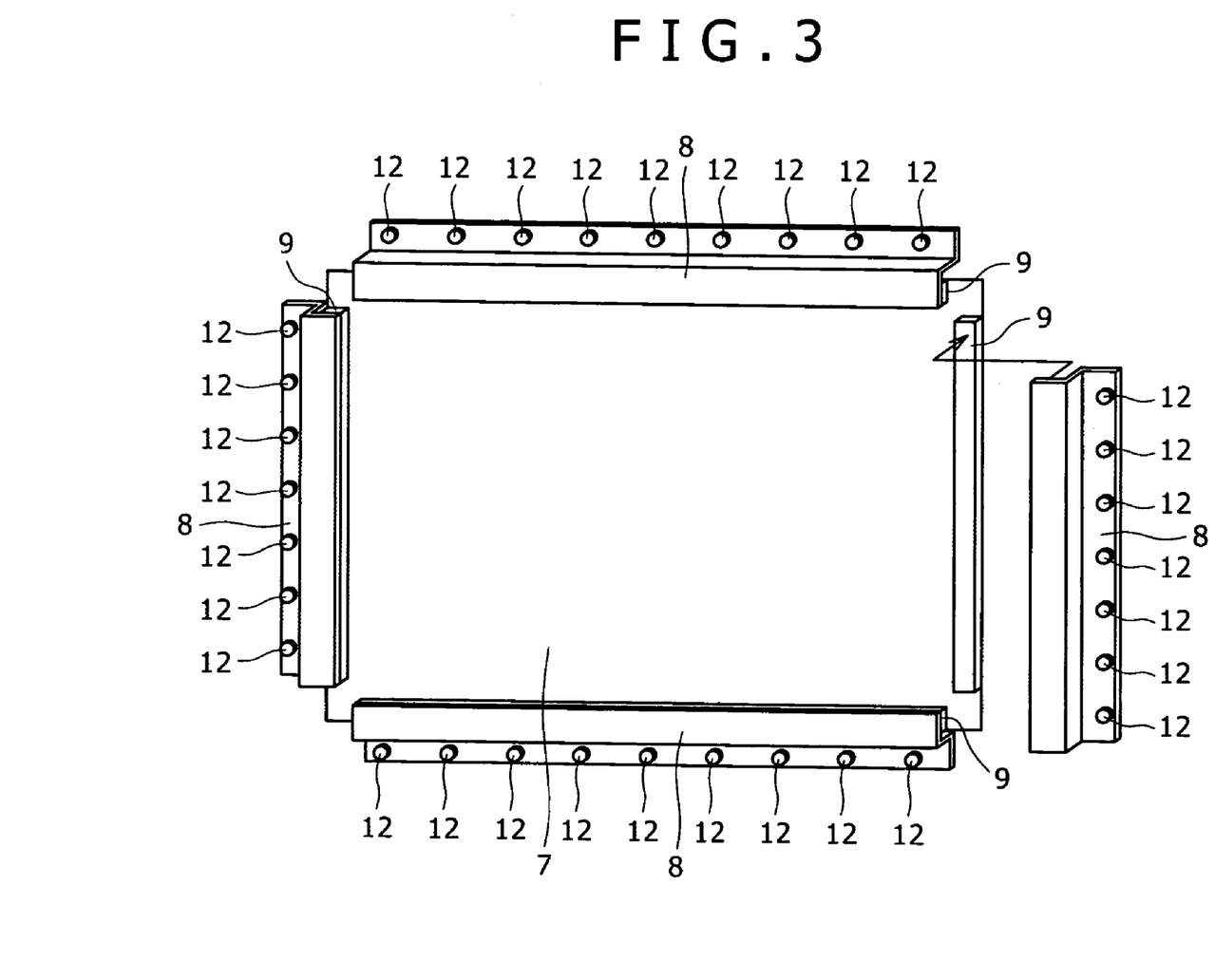
FIG. 3 is a perspective view of a lenticular lens sheet in a transmission type screen as viewed from rearward.
Figure 4:
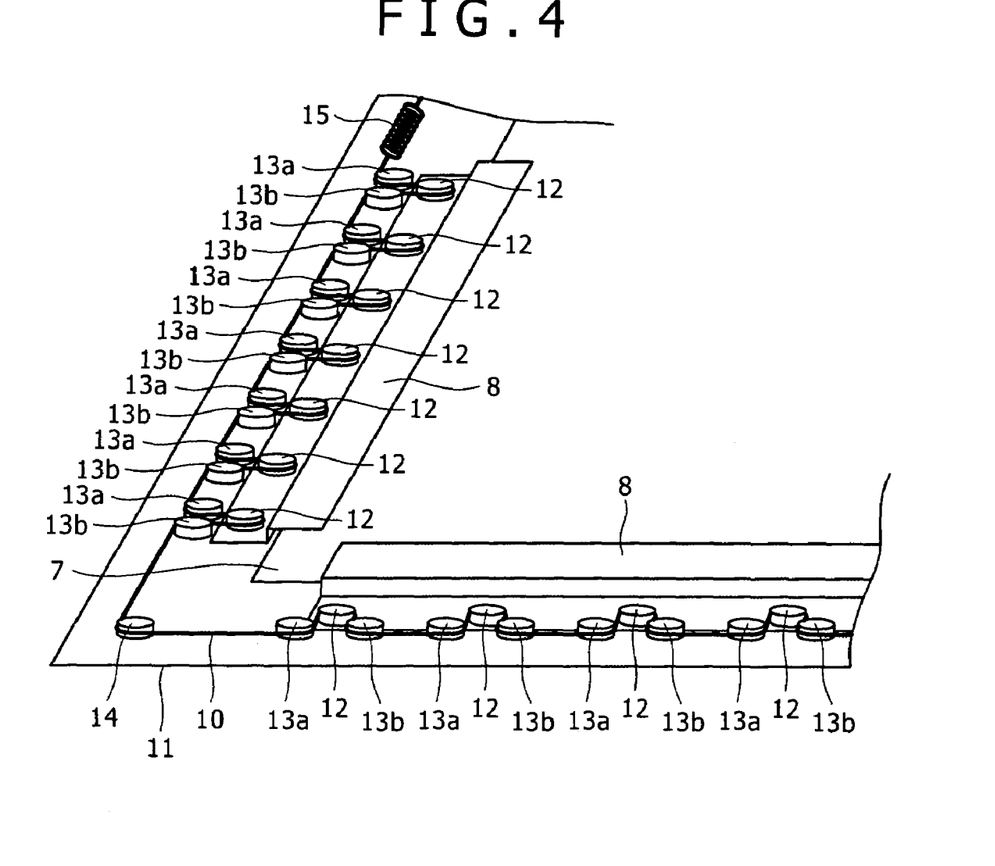
FIG. 4 is a schematic perspective view of an attachment structure of the lenticular lens sheet.
Figure 5:
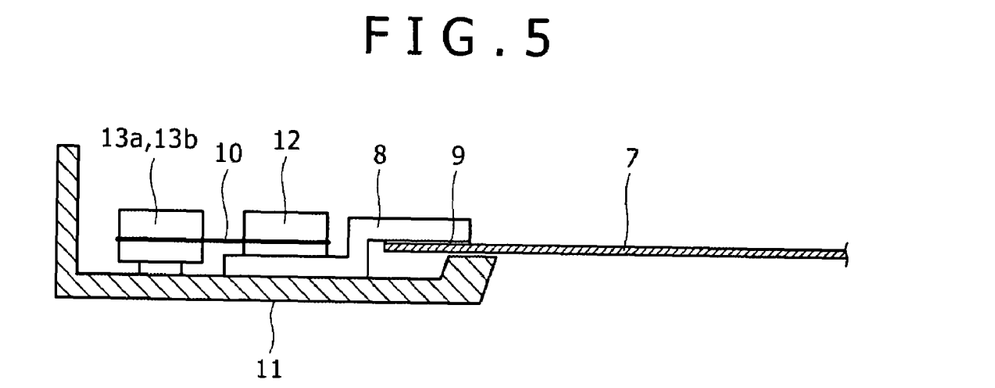
FIG. 5 is a cross-sectional view of FIG. 4.

FIG. 3 is a perspective view of the lenticular lens sheet as viewed from rearward. FIGS. 4 and 5 are a schematic perspective view and a cross-sectional view, respectively, of the attachment structure of the lenticular lens sheet.

Referring to FIG. 3, the lenticular lens sheet 7 is made of a resin sheet formed in a horizontally long quadrangle. In addition, respective brackets are fixedly adhered to upper and lower horizontal side portions and left and right longitudinal side portions with double-face adhesive tape. The substrate of the lenticular lens sheet 7 preferably uses a resin material such as PET, PC, PP, PS, or ABS as a material less susceptible to deformation or strain due to environmental changes. It is conceivable that iron, aluminum, magnesium, titan, carbon, or resin materials can be used for the material of the bracket 8.

Referring to FIGS. 4 and 5, in the configuration of the present embodiment, a wire 10 as a pulling device is provided to extend around the lenticular lens sheet 7. The lenticular lens sheet 7 is attached to a screen frame 11 of an apparatus main body by pulling the brackets 8 disposed on the horizontal and longitudinal sides upward and downward, and leftward and rightward by the wire 10.

More specifically, a plurality of pulleys 12, serving as pulling portions, are attached to the brackets 8 along its longitudinal direction so as to be almost equally spaced apart from each other. Two pulleys 13a, 13b are attached to the rear side of the screen frame 11 so as to correspond to each pulley 12. In addition, a pulley 14 is attached to each corner portion of the screen frame 11. The single wire 10 is provided to extend along the entire circumference of the lenticular lens sheet 7 so as to be wound around the pulleys 12, 13a, 13b and 14. For instance, a stranded wire made of stainless steel is preferably used for the wire 10. In addition, a metal material or a hard resin material superior in abrasion resistance is used for the material of the pulleys 12, 13a, 13b and 14.

In this configuration, the wire 10 is given tensile force by the spring 15, which is an elastic body, so as to pull the pulleys 12 attached to the brackets 8 on the horizontal and vertical sides. Thus, the lenticular lens sheet 7 is attached while maintaining its stable planar shape. Even if expansion and contraction occurs due to the secular variation or environmental changes, they are absorbed by the spring 15, which effectively suppresses occurrence of wrinkles or sag, thereby maintaining the stable planar shape.

In the configuration described above, as shown in FIG. 6, the number of the pulleys 12 as the pulling portions provided on the horizontal side brackets 8(x) and that on the vertical side brackets 8(y) are set so as to approximately correspond to a ratio of the horizontal side length x to the vertical side length y of the lenticular lens sheet 7. For example, in the configuration shown in the figure, the ratio of the horizontal side length x to the vertical side length y of the lenticular lens sheet 7 is about 9:7. Therefore, the number of the pulleys 12 on the horizontal side bracket 8(x) is nine and the number of the pulleys 12 on the vertical side bracket 8(y) is seven. Similarly, if the horizontal to vertical ratio of the lenticular lens sheet 7 is 16:9, the number of the pulley 12 on the horizontal side bracket 8(x) is 16 and the number of the pulley on the vertical side bracket 8(y) is nine.

Figure 6:
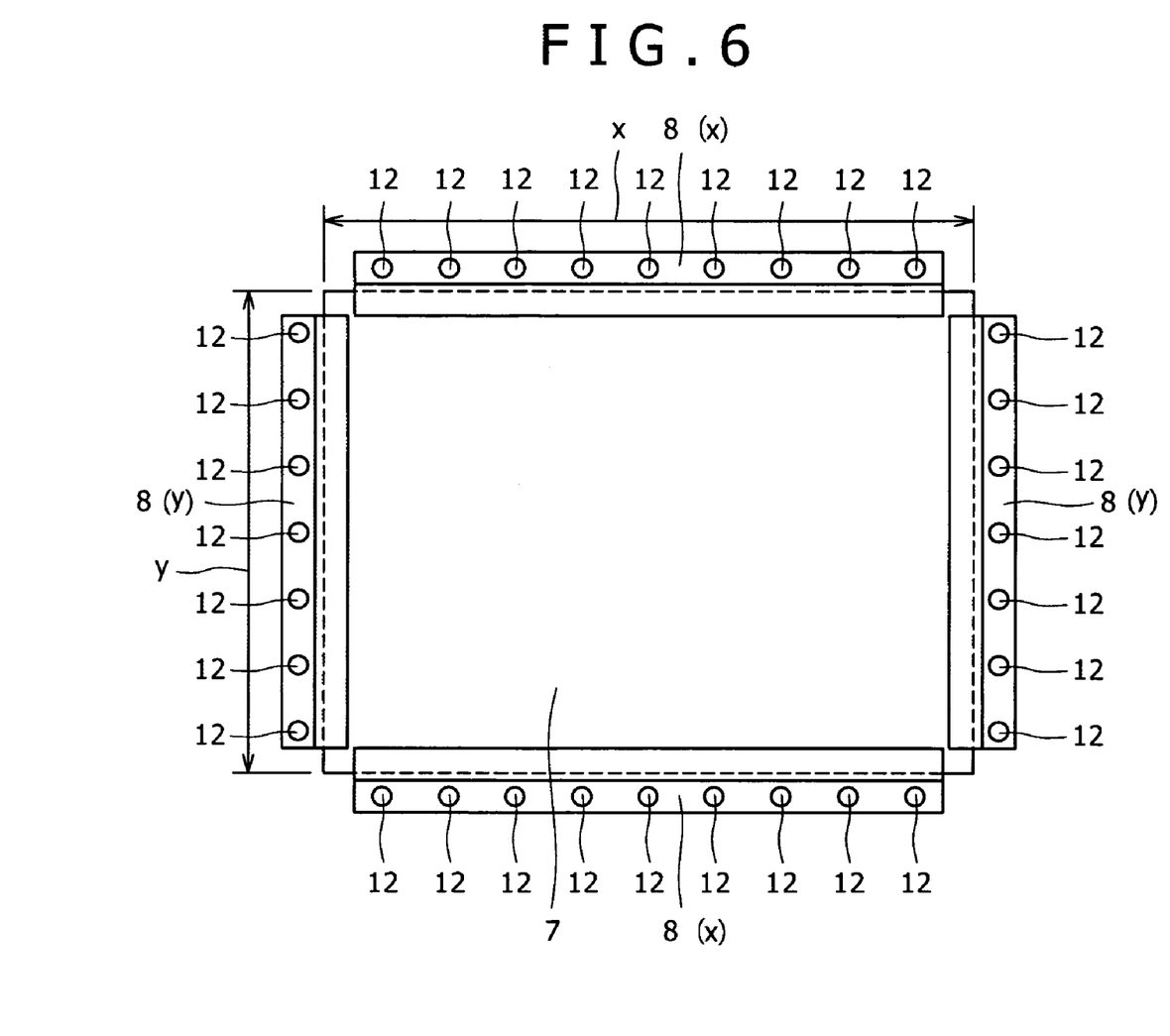
FIG. 6 is a diagram for assistance in explaining selection of the number of pulleys in the lenticular lens sheet.

In this way, the number of the pulleys 12 on the horizontal side bracket 8(x) and that on the vertical side bracket 8(y) are set so as to correspond to the size (the horizontal to vertical ratio) of the lenticular lens sheet 7. Force adapted to pull the horizontal side of the lenticular lens sheet 7 can be made approximately equal, per unit width, to that adapted to pull the vertical side thereof. The lenticular lens sheet 7 can be pulled by the uniform force. As a result, the lenticular lens sheet 7 can be attached with less deflection.

In the configuration of the present embodiment, the wire 10 and the lenticular lens sheet 7 are disposed so as to be flush with each other as obviously from FIG. 5, which prevents distortion of the lenticular lens sheet 7. This can maintain the lenticular lens sheet 7 in a stable planar shape.

In this configuration, the pulleys 12 are provided at the pulling portions of the lenticular lens sheet 7. When expansion and contraction occur in the lenticular lens sheet 7, the wire 10 can smoothly move to respond to the expansion and contraction. The force of the wire 10 for pulling the lenticular lens sheet 7 can be maintained stably and uniformly.

With the configuration described above, the transmission type screen of the present embodiment can surely maintain the planar shape of the lenticular lens sheet 7. Thus, deterioration in image quality such as distortion of an image or the degradation of focus can be surely prevented.

In the configuration described above, because of design limitation, it is sometimes difficult to set the number of the pulleys 12 on the horizontal side bracket 8(x) and that on the vertical side bracket 8(y) so as to fully correspond to the horizontal to vertical ratio of the lenticular lens sheet 7. In such a case, the number of the pulleys 12 can be economically reduced by adjusting the force of the wire 10 for pulling the lenticular lens sheet 7 as below.

Figure 7A:
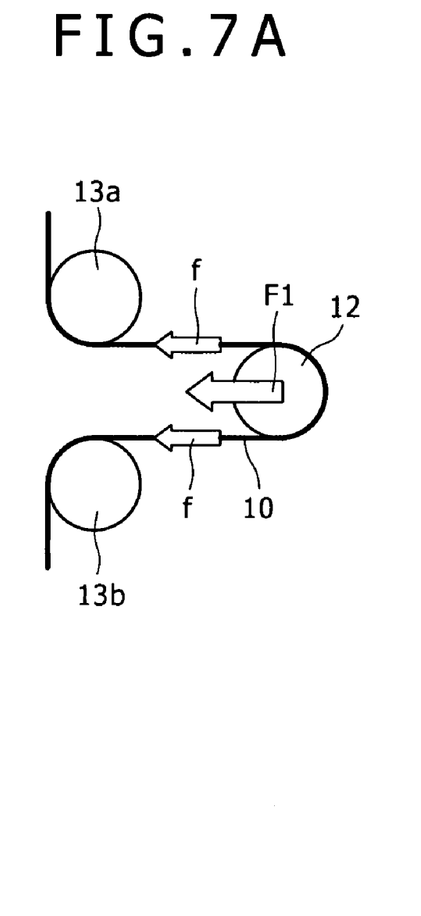
FIGS. 7A and 7B are diagrams for assistance in explaining adjustment of pull force for the lenticular lens sheet.
Figure 7B:
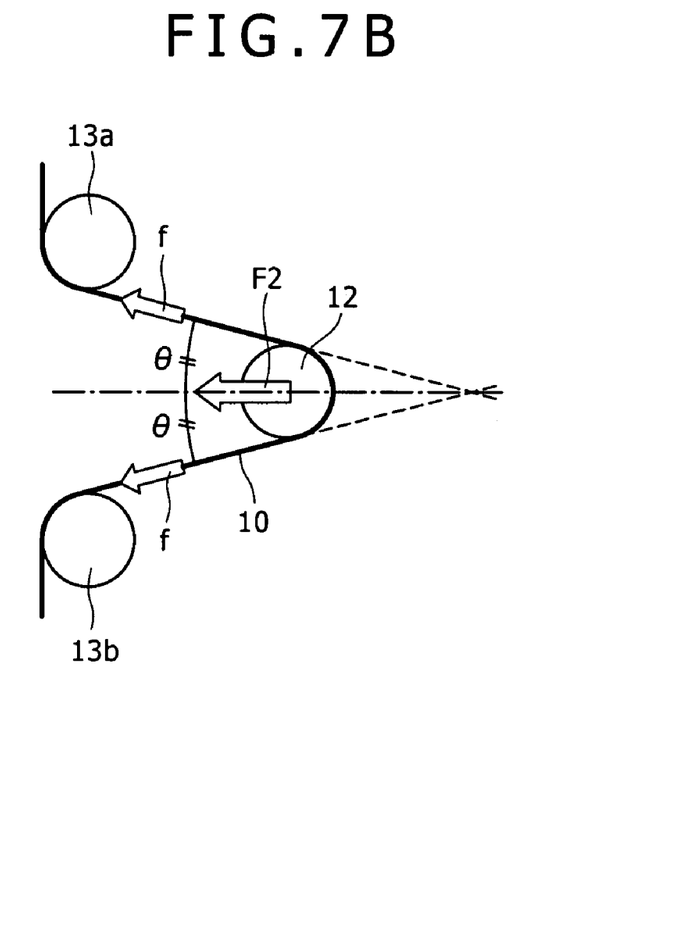

In this case, as shown in FIGS. 7A and 7B, the distance between the pulleys 13a and 13b is varied to vary the winding angle of the wire 10 wound around the pulley 12, thereby adjusting the force for pulling the lenticular lens sheet 7. In the cases of FIGS. 7A and 7B, pulling forces F1 and F2 applied to the lenticular lens sheet 7 by the pulley 12 are 2f and 2f cos θ, respectively. The relationship between the number of the pulleys 12 and the size of the lenticular lens sheet 7 can be represented by the following expression.

$$2n_x f \cos \theta_x / x = 2n_y f \cos \theta_y / y$$

$n_x$: the number of the pulleys of the horizontal sides
$n_y$: the number of the pulleys of the vertical sides
$\theta_x$: a winding angle of the wire wound around the pulley on the horizontal side
$\theta_y$: a winding angle of the wire wound around the pulley on the vertical side
x: a length of the horizontal side of the lenticular lens sheet
y: a length of the vertical side of the lenticular lens sheet The preferred embodiment of the present invention has been made thus far. However, the invention is not limited to the configuration of this embodiment.

Figure 8:
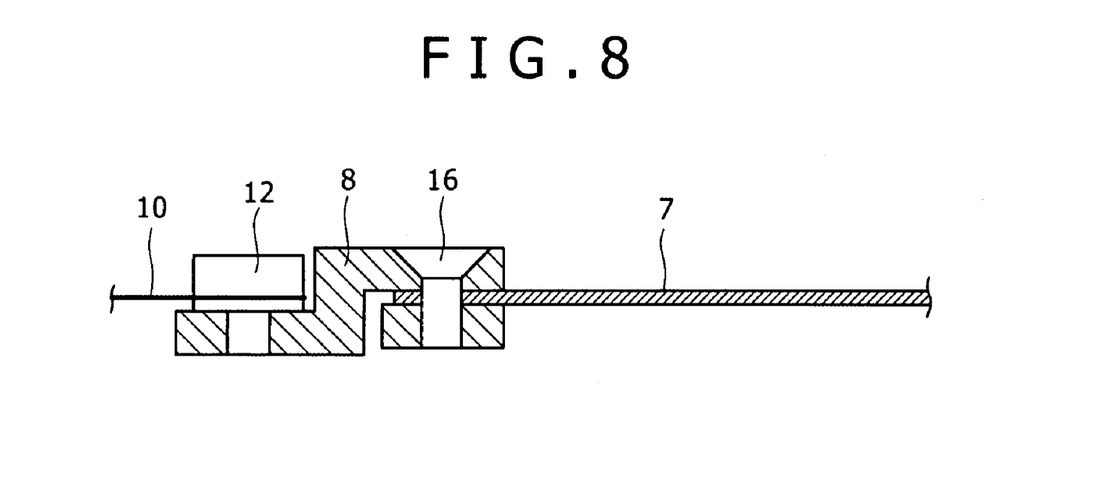
FIG. 8 illustrates a device of fixing a bracket to the lenticular lens sheet by way of another example.

For instance, the embodiment uses the double-face adhesive tape 9 as a device for fixing the bracket 8 to the lenticular lens sheet 7. In addition, it is conceivable to use e.g. an adhesive or UV bonding as a fixing device. As shown in FIG. 8, a screw 16 may be used to fix the bracket 8 to the lenticular lens sheet 7.

Figure 9:
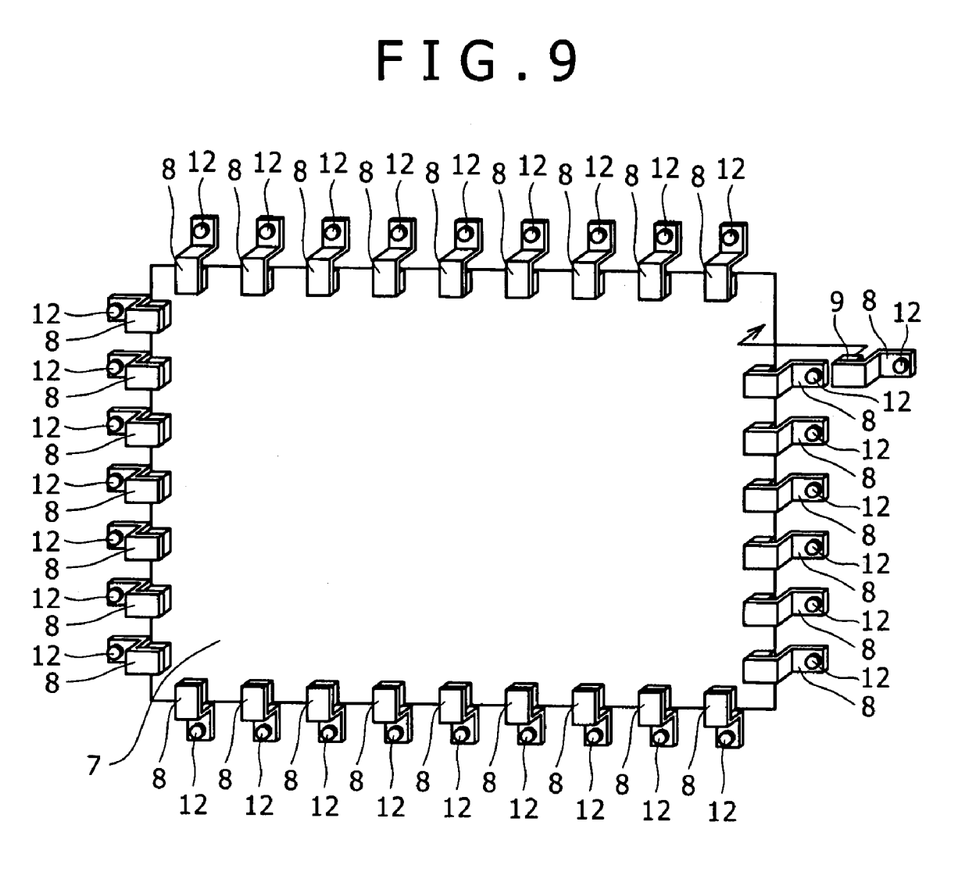
FIG. 9 illustrates divided brackets by way of example.

As shown in FIG. 9, the bracket 8 described above may be configured to be divided into segments or brackets 8 each of which corresponds to a pulley 12. With this configuration, even if expansion and contraction occurs in the lenticular lens sheet 7, the lenticular lens sheet 7 is less susceptible to the effect thereof. This makes it possible to effectively prevent the occurrence of wrinkles in the lenticular lens sheet 7.

Figure 10:
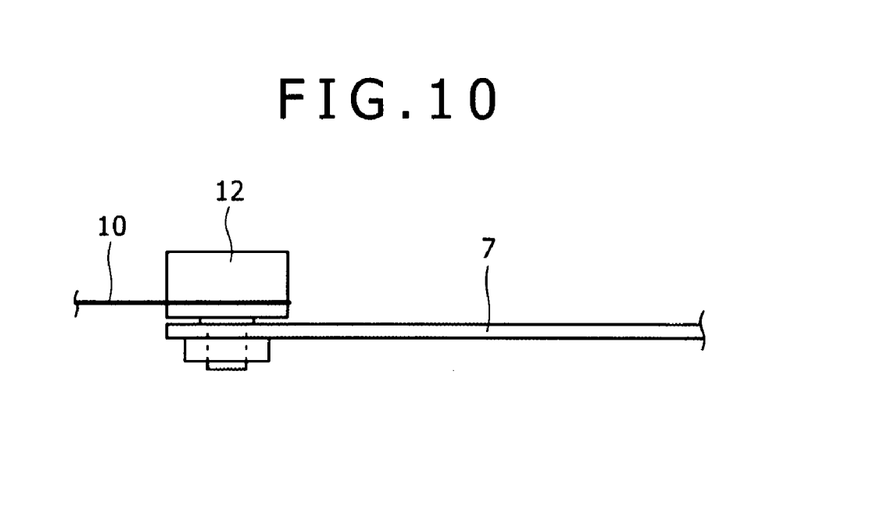
FIG. 10 illustrates a pulley directly attached to the lenticular lens sheet by way of example.

In FIG. 10, to reduce cost, the brackets are eliminated, so that the pulleys 12 are directly attached to the lenticular lens sheet 7. In this case, however, it is important to locate the wire 10 wound around the pulley 12 at a position close to the sheet surface of the lenticular lens sheet 7 as much as possible.

In the configuration described above, pins may be provided instead of the pulleys 12, 13a, 13b and 14 and the wire 10 is provided to be wound around the pins. The wire 10 is given the tensile force applied to the lenticular lens sheet 7 by the spring 15 which is an elastic body in the above configuration. However, the wire 10 itself may be made elastic so as to pull the lenticular lens sheet 7.

The present invention can modify or alter the other portions in various ways without restriction of the embodiment described above.

What is claimed is:

1. A rear projection display apparatus, comprising:
    an apparatus main body;
    a transmission type screen installed on a front face of the apparatus main body, the transmission type screen including a quadrangular lens sheet;
    a plurality of pull portions, the pull portions including pulleys;
    a pulling device which extends along a perimeter of the lens sheet; and
    a video projector inside the apparatus main body for projecting a video on the transmission type screen from a rear side,
    wherein the plurality of pull portions are provided along horizontal and vertical sides of the lens sheet, the plurality of pull portions being pulled upward, downward, leftward, and rightward by the pulling device, and
    wherein the number of pull portions on the horizontal and vertical sides of the lens sheet are set so as to correspond to a ratio of a horizontal side length to a vertical side length of the lens sheet.

2. The rear projection display apparatus according to claim 1, wherein the pulling device is made of a single wire which extends along the perimeter of the lens sheet.

3. The rear projection display apparatus according to claim 2, wherein the wire and the lens sheet are disposed to be flush with each other.

4. The rear projection display apparatus according to claim 2, wherein the wire is wound around the pull portions.

5. The rear projection display apparatus according to claim 4, wherein each pull portion is attached to a bracket fixedly attached to each of horizontal and vertical sides of the lens sheet.

6. The rear projection display apparatus according to claim 5, wherein the bracket is divided into segments, each of the segments corresponding to each of the pull portions.

7. The rear projection display apparatus according to claim 5, wherein the bracket and the lens sheet are fixedly bonded to each other with double-face adhesive tape.

8. The rear projection display apparatus according to claim 5, wherein the bracket and the lens sheet are fixed to each other with a plurality of screws.

9. The rear projection display apparatus according to claim 4, wherein the pull portion is a pin, the wire being wound around the pin.

10. The rear projection display apparatus according to claim 4, wherein a force of the wire for pulling the lens sheet can be adjusted by varying a winding angle of the wire wound around the pull portion.

11. A transmission type screen installed on a front face of a rear projection display apparatus, comprising:
    a quadrangular lens sheet;
    a plurality of pull portions, the pull portions including pulleys; and
    a pulling device which extends along a perimeter of the lens sheet,
    wherein the plurality of pull portions are provided along horizontal and vertical sides of the lens sheet, the plurality of pull portions being pulled upward, downward, leftward, and rightward by the pulling device, and
    wherein the number of pull portions on the horizontal and vertical sides of the lens sheet are set so as to correspond to a ratio of a horizontal side length to a vertical side length of the lens sheet.

12. The transmission type screen according to claim 11, wherein the pulling device is made of a single wire which extends along the perimeter of the lens sheet.

13. The transmission type screen according to claim 12, wherein the wire and the lens sheet are disposed to be flush with each other.

14. The transmission type screen according to claim 12, wherein the wire is wound around the pull portions.

15. The transmission type screen according to claim 14, wherein each pull portion is attached to a bracket fixedly attached to each of horizontal and vertical sides of the lens sheet.

16. The transmission type screen according to claim 15, wherein the bracket is divided into segments, each of the segments corresponding to each of the pull portions.

17. The transmission type screen according to claim 15, wherein the bracket and the lens sheet are fixedly bonded to each other with double-face adhesive tape.

18. The transmission type screen according to claim 15, wherein the bracket and the lens sheet are fixed to each other with a plurality of screws.

19. The transmission type screen according to claim 14, wherein the pull portion is a pin, the wire being wound around the pin.

20. The transmission type screen according to claim 14, wherein a force of the wire for pulling the lens sheet can be adjusted by varying a winding angle of the wire wound around the pulling portion.

* * * * *